Sept. 20, 1938.  E. E. HEWITT  2,130,619
FLUID PRESSURE BRAKE
Filed May 26, 1936
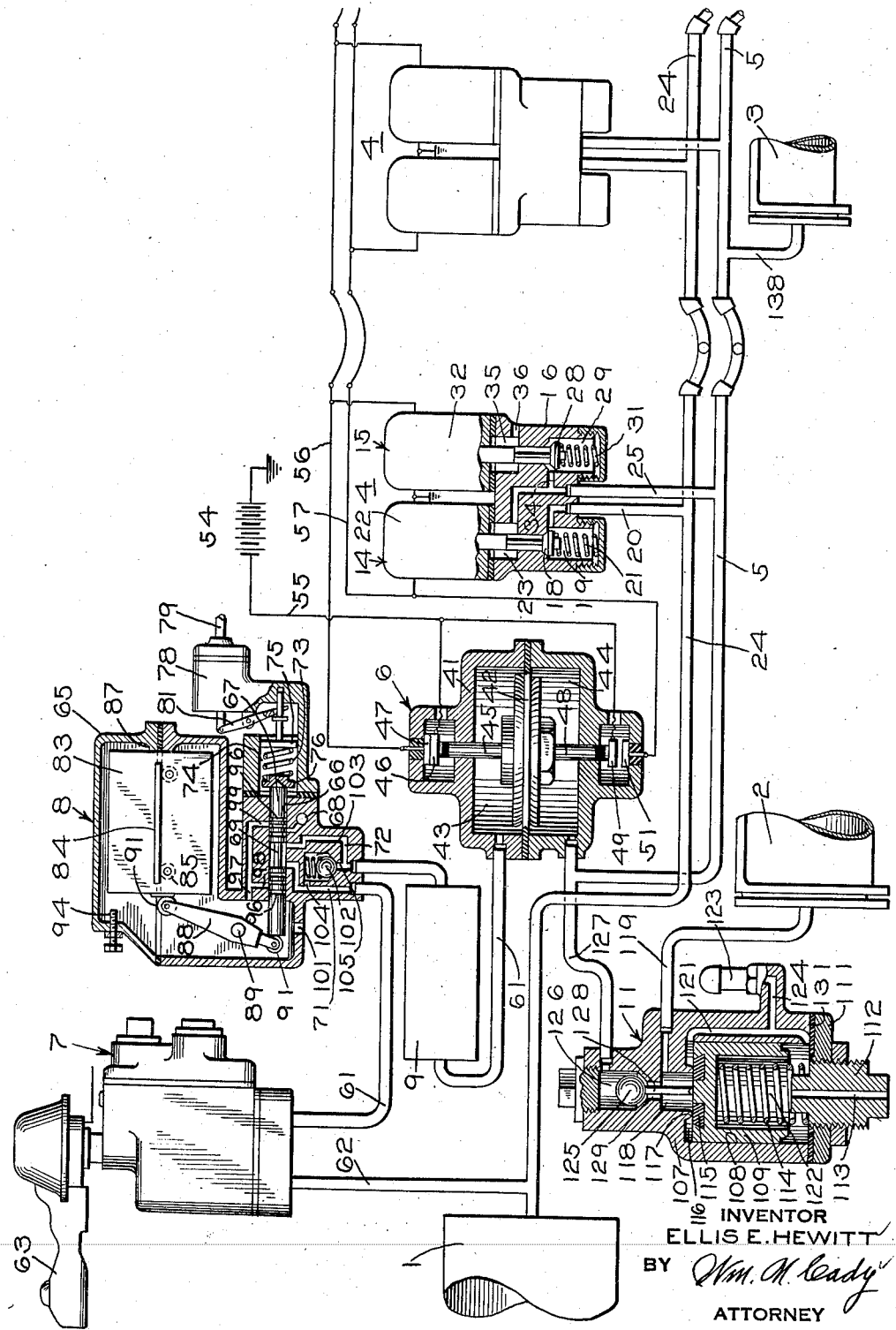
INVENTOR
ELLIS E. HEWITT
BY *Wm. M. Cady*
ATTORNEY Patented Sept. 20, 1938

2,130,619

UNITED STATES PATENT OFFICE 2,130,619

FLUID PRESSURE BRAKE

Ellis E. Hewitt, Edgewood, Pa., assignor to The Westinghouse Air Brake Company, Wilmerding, Pa., a corporation of Pennsylvania Application May 26, 1936, Serial No. 81,858

5 Claims. (Cl. 303—6)

This invention relates to fluid pressure brakes, and especially to electropneumatically controlled brakes for vehicles or trains operating at high speeds.

The power for driving the electric propelling motors of high speed trains of a certain type is usually supplied from generators driven by Diesel engines. The powered car of the train is the head or first car and consequently due to the weight of the power equipment the weight supported on the traction wheel-truck associated with the head car is a large percentage of the total weight of the train. As is well known, it is desirable to effect application of the brakes on all cars of the train as nearly as possible with the same braking ratio, that is ratio of braking force to the weight carried by the truck of the car. It has been found, however, in the case of the usual braking equipment heretofore employed for the above mentioned type of high speed trains, which equipment provides substantially the same braking ratio for the traction truck and for the trailer trucks associated with other cars of the train, that during heavy applications of the brakes the braking forces with which the brake shoes are applied to the wheels of the traction truck, although insufficient to cause sliding of the wheels on the traction truck due to the heavy load carried by the truck, are so great as to develop sufficient heat in the brake shoes of the traction truck to bring the metal of the brake shoes to a molten stage, and cause metal from the brake shoes to be welded to the rims of the truck wheels.

In order to overcome this difficulty, a modified arrangement of the usual braking equipment for the heavily loaded traction truck has been proposed, in which modified arrangement the braking ratio for the traction truck of the train is less than that for the trailer trucks. The resulting effect of this modified arrangement was found to be undesirable for the reason that the automatic reduction in the braking forces simultaneously and uniformly on all trucks of the train under the control of the usual retardation controller employed, would produce a disproportionate effect on the retardation controller of the train due to the inertia of the heavily weighted head car, particularly at the lower speeds, and thus the braking forces effecting application of the brakes associated with the wheels of the more lightly loaded trailer trucks of the train, as determined by the operation of the retardation controller, would be sufficient to cause sliding of the wheels on the trailer trucks without the rate of retardation determined by the retardation controller being exceeded.

It is accordingly the principal object of my invention to overcome the difficulties above pointed out.

More specifically, it is an object of my invention to provide means whereby the application of the brakes associated with all wheel-trucks of the train may be at a substantially uniform ratio for the lighter applications of the brakes while at the same time guarding against the development of excessive heat in the brake shoes associated with the more heavily loaded traction truck, during the heavier applications of the brakes, so as to prevent welding of portions of the brake shoes to the truck wheels.

The above objects and other objects of my invention which will be made apparent hereinafter are attained by means of an illustrative embodiment of my invention subsequently to be described and shown in the accompanying drawing wherein the single figure is a diagrammatic simplified view, with parts thereof in section, showing a brake equipment having my invention embodied therein.

The brake equipment illustrated in the drawing includes only those essential parts necessary to point out the manner of operation of the system and the application and embodiment of my invention therein. It should be understood, however, that I contemplate the adaptation of my invention in a brake system of the character described in detail in my pending application, Serial No. 741,063, filed August 23, 1934, and assigned to the assignee of this application.

The brake equipment shown in the drawing includes a main reservoir 1, a brake cylinder 2 for effecting the application of the brakes on the heavily loaded traction truck, a brake cylinder 3 illustrative of all brake cylinders associated with the more lightly loaded trailer trucks on one or more cars of the train, a plurality of magnet valve mechanisms 4 disposed respectively on different cars of the train for controlling the supply and release of fluid under pressure to and from a straight air pipe 5 at intervals along the length thereof, the brake cylinders 2 and 3 being connected to the straight air pipe 5 as hereinafter described, a pneumatic switch device 6 for controlling the magnet valve mechanisms 4, a brake controlling valve device 7 for controlling operation of pneumatic switch device 6, a retardation controller device 8 for automatically regulating the operation of the pneumatic switch device 6, and a control reservoir 9.

According to my invention, I further provide a cut-out valve device or pressure limiting device 11 operative to limit the pressure of the fluid supplied to the traction truck brake cylinder 2 to such a pressure as to prevent the development of excessive heat in the brake shoes on the traction truck and accordingly the destruction of the brake shoes as well as impairment in braking effectiveness occasioned by the welding of portions of the brake shoes to the rims of the traction truck wheels due to excessive heat.

Referring again to the drawing, various parts making up the equipment shown will now be described in greater detail. Each of the valve mechanisms 4 comprises an application magnet valve device 14 and a release magnet valve device 15 embodied in a casing 16.

The application magnet valve device 14 comprises a supply valve 18 contained in a chamber 19, the valve being yieldingly urged into seated relation on its associated valve seat by a spring 21 contained in the chamber 19 and being operatively unseated from its valve seat against the force of spring 21 upon energization of an electromagnet 22 contained in the casing 16. The chamber 19 is connected by a passage and pipe 20 to a suitable source of fluid pressure illustrated, for simplicity, as a supply pipe 24 connected to the main reservoir 1, but it should be understood that, in practice, it is connected to a local reservoir charged through a relay valve in the manner shown and described in the above mentioned pending application, Serial No. 741,063. When the valve 18 is unseated, it establishes communication between the chamber 19 and a chamber 23 which is constantly connected by a passage and pipe 25 to straight air pipe 5 extending throughout the length of the train.

The release magnet valve device 15 comprises a release valve 28 contained in a chamber 29 and normally held unseated from its associated valve seat against the force of a biasing spring 31 due to the energization of an electromagnet 32.

The chamber 29 is in constant communication with the straight air pipe 5 through the pipe and passage 25 and a branch passage 34. When unseated, the valve 28 establishes communication from the chamber 29 to a chamber 35 which is open to atmosphere through a port 36. When the release valve 28 is seated on its valve seat by the spring 31 on deenergization of the release electromagnet 32, communication between chambers 29 and 35 is closed to permit build-up of pressure in the straight air pipe 5 under control of the supply valve 18.

The pneumatic switch device 6 comprises essentially a casing 41 containing a movable abutment or diaphragm 42 and having at one side of the diaphragm 42 a chamber 43 and at the opposite side a chamber 44. A stem 45 suitably secured to the diaphragm 42 at one side thereof carries in insulated relation thereon a movable contact member 46 which is normally, that is while the train is traveling along the road with brakes released, held in contact with a stationary contact member 47 secured in insulated relation to the casing 41. A stem 48 secured to the diaphragm 42 and extending from the opposite side thereof in a similar manner carries a movable contact member 49 which is normally out of contact with an associated stationary contact member 51 secured in insulated relation on the casing 41. The contact members 46 and 47 function to control the circuit of the electromagnet 32 of the release magnet valve devices 15 of the valve mechanisms 4, and the contact members 49 and 51 function to control the circuit for energizing the electromagnet 22 of the application magnet valve devices 14 for the valve mechanisms 4.

The movable contact members 46 and 49 are both connected to one terminal of a suitable source of electrical supply, such as a battery 54, by a wire 55. The contact member 47 is connected to a train wire 56 which extends throughout the length of the train, one terminal of the electromagnet 32 of the various release magnet valve devices 15 being connected to the wire 56. The contact member 51 is similarly connected to a train wire 57 extending throughout the length of the train, one terminal of the electromagnet 22 of the various application magnet valve devices 14 being connected to the wire 57. The remaining terminals of the application and release electromagnets 22 and 32 are connected to the other terminal of the battery 54 as through a ground connection.

The brake controlling valve device 7 is shown only in outline for the sake of simplicity, it being understood that it is of any suitable self-lapping type, such as that shown and described in the above mentioned pending application Serial No. 741,063, whereby the pressure of the fluid supplied into a control pipe 61 from a pipe 62 leading to the main reservoir 1 corresponds to the degree of movement of the operating handle 63 thereof out of its normal release position into a so-called straight air application zone. While the pipe 62 is shown as directly connected to the main reservoir 1 it will be understood that the usual feed valve device is employed for regulating fluid pressure supplied to the pipe 62 from the main reservoir in well known manner, the feed valve being omitted for the sake of simplicity.

Fluid under pressure supplied into the control pipe 61 under the control of the controlling device 7 is ultimately supplied to the chamber 43 of the pneumatic switch device 6, the retardation controller device 8 serving to regulate the pressure of the fluid in the chamber 43 in the manner hereinafter described independently of the position of the operating handle 63 of the brake controlling valve device 7. The control reservoir 9 is interposed in the control pipe 61 between the retardation controller device 8 and the chamber 43 of the pneumatic switch device 6 in order to provide additional volume capacity for the chamber 43 to prevent undesirable rapid venting of the chamber 43 by the retardation controller device 8, the volume of the chamber 43 being relatively small.

The retardation controller device 8 comprises a casing 65 containing a circular bore 66 in which operates a cylindrical slide valve 67 for controlling communication between a passage 71, to which is connected the portion of the control pipe 61 leading out of the brake controlling valve device 7, and a passage 72, to which is connected the portion of the control pipe 61 leading to the control reservoir 9 and chamber 43 of the pneumatic switch device 6. Slide valve 67 also controls communication between the passage 72 and an atmospheric exhaust passage 68 which opens into the bore 66. A spring 73 contained in a chamber 74 at one side of a piston 75 and interposed between the piston 75 and a collar or flange 76 at the end of the slide valve 67 serves to normally yieldingly bias the slide valve to the position shown in the drawing, wherein a fluted portion 69 of the slide valve establishes communication between the passages 71 and 72 which open into the bore 66. Additional tension may be placed on the spring 73 to resist movement of the slide valve 67 in the right-hand direction, by means of a pressure cylinder 78 which is normally supplied with fluid under pressure through a pipe 79 and which contains a piston, not shown, that is spring actuated upon the reduction of pressure of fluid in the cylinder to actuate the piston 75 in the left-hand direction through the medium of a pivoted lever 81. This feature of the retardation controller device 8, being non-essential for the purposes of describing my present invention, is not further described herein, it being understood however, that I intend operation thereof in the manner described in my pending application, Serial No. 741,063, above referred to.

Movement of the slide valve 67 in the right-hand direction against the force of the spring 73 is effected by movement of an inertia operated body 83 which is provided with horizontally extending wings or flanges 84 on opposite sides thereof whereby the body 83 is supported for horizontal movement on a plurality of frictionless rollers 85 carried on the casing 65 of the retardation controller device. The inertia body 83 is normally yieldingly biased in the right-hand direction into contact with a limit stop 87 on the casing 65 by the spring 73 acting through the cylindrical slide valve 67 and a pivoted lever 88. The lever 88 is pivoted intermediate its ends on a pin 89 secured to the casing 65 and is provided at its opposite ends with rollers 91, the roller 91 at one end of the lever 88 engaging the end face of the inertia body 83 and the roller 91 at the opposite end engaging the end of the cylindrical slide valve 67 opposite to that having the flange 76 whereon the spring 73 acts. When the inertia body moves in the left-hand direction, in response to the retardation of the vehicle, the lever 88 is pivoted on the pin 89 in a counterclockwise direction and the cylindrical slide valve 67 is thereby moved in the right-hand direction against the force of the spring 73. It will be understood, therefore, that the slide valve 67 will be moved varying degrees in the right-hand direction from the position shown in the drawing dependent upon the rate of retardation produced on the vehicle or train of cars, the maximum degree of movement of the slide valve 67 being limited by the adjustment of the adjusting stop screw 94 which is in the path of movement of the inertia body 83.

The cylindrical slide valve 67 is provided on opposite sides of the fluted portion 69 with a plurality of spaced annular grooves 96 extending around the periphery thereof for collecting the leakage of fluid under pressure between the slide valve 67 and the wall in the bore 66, a pressure equalizing passage 97 being provided in the casing 65 opening into the bore 66 through a pair of spaced ports 98 and 99 and also into the interior of the casing 65 which is open to atmosphere through a port 101 for dissipating the leakage and balancing the forces of the fluid pressures acting on the slide valve 67.

A ball check valve 102, contained in a chamber 103 which is open to the passage 71 through a port 104 and to the passage 72 through a port 105, is yieldingly urged into seated relation on a valve seat to close the port 105 to prevent flow of fluid under pressure therepast through the control pipe to the chamber 43 of the pneumatic switch device 6, and to permit flow of fluid under pressure therepast from the chamber 43 through the control pipe 61 in the opposite direction, independently of the position of the slide valve 67.

The pressure limiting valve device 11 which I provide according to my invention, comprises a casing 107 having a bore 108 in which a piston valve 109 operates, the bore 108 being open at one end. A cover 111 for the open end of bore 108 is provided with a screw plug 112 having a vent port 113 therein. A coil spring 114 interposed between the screw plug 112 and one face of the piston valve 109 yieldingly urges the piston valve 109 in a direction to cause an annular gasket 115 in the opposite face of the piston valve to engage an annular rib seat 117 to cut off communication between a chamber 116 at the one side of the piston valve 109 and a chamber 118 in the casing 107, which chamber 118 communicates with the traction truck brake cylinder 2 through a pipe and passage 119. When the piston valve is seated on the annular rib seat 117, the chamber 116 is in communication through a passage 121 with a chamber 122 at the opposite side of the piston valve 109, the chamber 122 being constantly open to atmosphere through the vent port 113. A safety valve device 123, of well known construction, is constantly connected to chamber 116 through a branch passage 124 opening out of the passage 121.

A ball check valve 125, contained in a chamber 126 which is constantly connected to the chamber 44 of the pneumatic switch device 6 through a pipe 127, is unseated from its cooperating valve seat by a stem 128 secured to the piston valve 109 to open communication between the chamber 126 and the chamber 118 through a port 129.

The straight air pipe 5 opens into the pipe 127 and consequently fluid under pressure is supplied directly from the straight air pipe to the chamber 44 of the pneumatic switch device 6 and, under the control of the pressure limiting valve device 11, to the traction truck brake cylinder 2. The biasing spring 114 of the piston valve 109 is so designed and the tension thereof is so adjusted by adjustment of the screw plug 112 that at least a certain uniform fluid pressure acting within the chamber 118 on the inner seated area of the piston valve 109 is required in order to overcome the force of the spring 114 and unseat the piston valve from the annular rib seat 117. Once the piston valve 109 is unseated, the entire face of the piston valve 109 is subject to the pressure of fluid within the chamber 116, instead of only the inner seated area thereof within chamber 118, and thus the piston valve is suddenly snapped or moved by the increased total force to a position in which the lower edge of the piston valve engages a gasket seat provided by the sealing gasket 131 interposed between the casing 107 and the cover 111, in which position communication between the chamber 116 and the chamber 122 through the passage 121 is cut off. Movement of the piston valve 109 away from the annular rib seat 117 causes retraction of the stem 128 on the piston valve, thereby permitting the ball check valve 125 to drop into seated engagement on its associated valve seat to close the port 129 and thereby cut off communication for the flow of fluid under pressure from the chamber 126 to the chamber 118, the check valve 125 being at the same time adapted to unseat and permit flow of fluid under pressure from chamber 118 to chamber 126 in the opposite direction.

*Operation*

In operation, assuming the main reservoir to be charged with fluid under pressure in the usual manner from a suitable fluid compressor, not shown, the equipment is charged with fluid under pressure from the main reservoir 1. It will be understood that while I have illustrated a supply pipe 24 charged directly from the main reservoir 1, a local reservoir may be provided for each of the valve mechanisms 4 and charged with fluid under pressure from the main reservoir 1 under the control of a relay valve device in the manner described and shown in my above mentioned pending application, Serial No. 741,063.

*Straight air application of the brakes*

Assuming the train of cars to be traveling along the road with the brake equipment conditioned as shown in the drawing, a straight air aplication of the brakes is effected by turning the operating handle 63 of brake controlling valve device 7 from its release position into the straight air application zone a certain degree, according to the degree of the application desired. Fluid under pressure is accordingly supplied from the main reservoir 1 to the chamber 43 of the pneumatic switch device 6 through pipes 24 and 62, brake controlling device 7, control pipe 61, passage 71 of the retardation controller device 8, through the fluted portion 69 of the cylindrical slide valve 67, passage 72, control reservoir 9, and the remaining portion of the control pipe 61, pressure attained in the chamber 43 being determined by the position of the operating handle 63 in the application zone. The chamber 44 of the pneumatic switch device 6 being at atmospheric pressure, as will hereinafter be made apparent, the pressure of the fluid in the chamber 43 actuates the diaphragm 42 downwardly to effect the disengagement of the contact member 46 and the contact member 47 and to effect engagement of the contact member 49 with the contact member 51. The electromagnet 32 of the release magnet valve devices 15 for the valve mechanisms 4 are all accordingly deenergized and the electromagnet 22 of the application magnet valve devices 14 are all accordingly energized, due to the separation of the contact members 46 and 47 and the engagement of the contact members 49 and 51, respectively. Since the contact members 46 and 47 disengage to interrupt the circuit for the electromagnet 32 of the release valve devices 15 before the contact members 49 and 51 engage to complete the circuit for energizing the application magnet valve devices 14, the release valve 28 is actuated to its seated position to close off communication from straight air pipe 5 to the atmosphere by way of the port 36 before the supply valve 18 is unseated to supply fluid under pressure from the supply pipe 24.

The valve mechanisms 4 are thus all simultaneously operated to supply fluid under pressure locally from the supply pipe 24 into the straight air pipe 5 so that there occurs a substantially uniform pressure build-up along the entire length of the straight air pipe.

Each of the trailer truck brake cylinders 3 is directly connected to the straight air pipe 5, as through a branch pipe 138, and is thus supplied with fluid corresponding in pressure to that in the straight air pipe 5.

Fluid under pressure is also supplied from the straight air pipe 5 to the chamber 44 of the pneumatic switch device 6 by way of pipe 127, and to the traction truck brake cylinder 2 by way of pipe 127, chamber 126 of the pressure limiting valve device 11, past the unseated check valve 125, through port or passage 129, chamber 118, and passage and pipe 119. As long as the pressure of the fluid supplied to the traction truck brake cylinder 2 and accordingly to the chamber 118 of the pressure limiting valve device 7 does not exceed the certain uniform pressure, for example seventy-five pounds per square inch, necessary to overcome the force of the spring 114 and unseat the piston valve 109 from the annular rib seat 117, the check valve 125 is held unseated by the stem 128 to permit the supply of fluid under pressure to the traction truck brake cylinder 2.

When the pressure of the fluid supplied to the chamber 44 of the pneumatic switch device 6 approaches the pressure of the fluid in the chamber 43, as determined by the position of the operating handle 63 of the brake controlling device 7, the diaphragm 42 accordingly returns toward its original position and causes separation of the contact member 49 from the contact member 51 to effect the immediate deenergization of the application magnet valve devices 14 for the valve mechanisms 4 and the immediate seating of the supply valves 18 to cut off the further supply of fluid under pressure into the straight air pipe 5 and to the brake cylinders 2 and 3. Further increase in the pressure of the fluid in the chamber 44 is thus stopped due to the immediate seating of the supply valves 18 of the magnet devices 14, and the diaphragm 42 thus remains in an intermediate position in which the contact member 46 is disengaged from the contact member 47 at the same time that the contact member 49 is separated from the contact member 51. Consequently, the release valve 28 is seated at the same time that the supply valve 18 is seated and the pressure of the fluid in the brake cylinders 2 and 3 and in the straight air pipe 5 is accordingly maintained at the attained value of pressure so that the valve mechanisms 4 are said to be in lapped position.

It will be noted that if for any reason the pressure in the straight air pipe 5 and in the brake cylinders 2 and 3 diminishes, as by leakage, the resulting reduction in the pressure of the fluid in the chamber 44 of the pneumatic switch device 6 will result in downward movement of the diaphragm 42. If the reduction in the pressure of the fluid in the chamber 44 is sufficient, reengagement of the contact member 49 with the contact member 51 will be effected. The application magnet valve devices 14 will thus again be energized and the supply valve 18 thereof unseated to supply sufficient fluid under pressure to the straight air pipe 5 and the brake cylinders 2 and 3 to again build up the pressure therein and in the chamber 44 of the pneumatic switch device 6. This results in upward movement of the diaphragm 42 to its intermediate position in which the contact member 49 is again disengaged from the contact member 51 to effect deenergization of the application magnet valve devices 14 and the consequent reseating of the supply valve 18. It will thus be seen that the pneumatic switch device 6 functions to control the degree of the pressure obtained in the brake cylinders 2 and 3 and to maintain a pressure in the brake cylinders according to the position of the operating handle 63 of the brake controlling device 7.

In order to effect a full straight air application of the brakes, the operating handle 63 is moved to its fullest extent out of the release position and into the straight air application zone. The pressure of the fluid in the chamber 43 of the pneumatic switch device 6 is accordingly increased to a degree corresponding to the position of the operating handle 63 and the valve mechanisms 4 are operated, as in the manner before described, to effect the supply of fluid under pressure into the straight air pipe 5 and thence to the brake cylinders 2 and 3. Similarly, in the manner previously described, when the pressure of the fluid in the chamber 44 of the pneumatic switch device 6 approaches the pressure in the chamber 43, the diaphragm 42 is moved upwardly to an intermediate position in which the contact member 46 is separated from the contact member 47 at the same time as the contact member 49 is separated from the contact member 51, thereby causing the valve mechanisms 4 to be in lapped condition.

The pressure of the fluid supplied from the main reservoir 1 is such that when a full straight air application of the brakes is effected, the pressure of the fluid in the straight air pipe 5 and in the chamber 44 of the pneumatic switch device 6 increases above the certain uniform pressure which causes unseating of the piston valve 109 from its annular rib seat 117. Consequently, when the piston valve 109 is unseated from the annular rib seat 117 and moved into engagement with the gasket 131, the check valve 125 seats on its associated valve seat to close port 129 and thus cut off the further supply of fluid under pressure to the traction truck brake cylinder 2. Since the piston valve 109 is snapped suddenly into its seated position on the gasket 131, the communication between the chamber 116 and the atmospheric chamber 122 through the passage 121 is substantially immediately cut off, thereby preventing loss of pressure in the traction truck brake cylinder 2.

Since the trailer truck brake cylinders 3 are connected directly to the straight air pipe 5, the pressure of fluid supplied thereto continues to build up after the supply of fluid under pressure to the traction truck brake cylinder 2 has been cut off, until the ultimate or maximum pressure is attained, which may be, for example, ninety pounds per square inch.

If the piston valve 109 should happen to stick momentarily in the bore 108, or if for any other reason the piston valve 109 does not promptly unseat from its rib seat 117 in response to the requisite predetermined pressure, thereby causing more than the certain uniform pressure of seventy-five pounds per square inch to be built up in the traction truck brake cylinder 2, the safety valve 123 functions to immediately reduce the pressure in the traction brake cylinder 2 to a certain pressure only a few pounds per square inch higher than the predetermined pressure, as for example, to a pressure of eighty pounds per square inch, whenever the piston valve 109 does finally unseat from the rib seat 117 and engage the gasket 131.

As the train of cars begins to decelerate due to the application of the brakes as effected by the brake cylinders 2 and 3, the inertia body 83 moves in the left-hand direction to a degree dependent upon the rate of retardation produced on the train of cars. As the rate of retardation produced on the train of cars approaches the rate as determined by the tension of spring 73 of the retardation controller, movement of the cylindrical slide valve 67 in the right-hand direction sufficient to lap the passage 71 is effected, whereby the further supply of fluid under pressure to the chamber 43 of the pneumatic switch device 6 under the control of the brake controlling valve device 7 is prevented due to the connection between the passage 71 and the passage 72 being cut off. As the train of cars continues to decelerate, the braking effect produced by a given brake cylinder pressure or braking force increases, due to the increase in the coefficient of friction between the brake shoes and the car wheels at the lower speeds as compared to the coefficient of friction therebetween at the higher speeds.

Thus, as the car or train of cars continues to decelerate, the inertia body 83 will be urged with increasing force in the left-hand direction sufficiently to move the cylindrical slide valve 67 against the force of the spring 73 until the fluted portion 69 connects the passage 72 to the exhaust passage 68, whereupon the pressure of the fluid in the chamber 43 of the pneumatic switch device 6 is reduced. As previously explained, the control reservoir 9 provides additional volume capacity for the chamber 43 so that when the connection between the passage 72 and the atmospheric exhaust passage 68 is established by the cylindrical slide valve 67 in the manner just described, the reduction in the pressure of the fluid in the chamber 43 is effected slowly enough so that the valve mechanisms 4 may operate correspondingly to release fluid under pressure from straight air pipe 5 and the brake cylinders 2 and 3, in the manner subsequently to be described, without causing a complete release of the brakes.

When the pressure established in the chamber 43 is reduced by operation of the retardation controller device 8 in the manner just described, the pressure of the fluid in the chamber 44 moves the diaphragm 42 upwardly to cause reengagement of the contact member 46 with the contact member 47, thereby effecting energization of the magnet valve devices 15 and unseating of the release valve 28. The pressure of the fluid in the brake cylinders 2 and 3 and in the straight air pipe 5 is accordingly reduced past the unseated release valve 28 of the valve mechanisms 4 and through the exhaust port 36, until the pressure of the fluid in the chamber 44 is reduced sufficiently to cause return of the diaphragm 42 to its intermediate position in which both sets of the contact members are disengaged. The release magnet valve devices 15 are thus again deenergized and reseating of the release valves 28 effected to cut off the further reduction of the pressure of the fluid in the brake cylinders 2 and 3.

It will be seen, however, that as long as the pressure of the fluid in the straight air pipe 5 and in the chamber 126 of the cut-off valve device 11 exceeds the pressure in traction truck brake cylinder 2 and chamber 118, the check valve 125 is held seated by the higher fluid pressure acting thereon in the chamber 126 and that consequently no reduction in the pressure of the fluid in the traction truck brake cylinder 2 will take place while the pressure of the fluid in the straight air pipe 5 and in the trailer truck brake cylinders 3 is reducing to the pressure in the traction truck brake cylinder 2. When the pressure in straight air pipe 5 and thus in chamber 126 of the pressure limiting device 11 reduces below that in the traction truck brake cylinder 2, the higher pressure will unseat the check valve 125 and permit reduction of the pressure in the traction truck brake cylinder 2 together with and substantially in unison with the reduction in the straight air pipe pressure and thus in the trailer truck brake cylinders 3. It will be observed that since the traction truck brake cylinder pressure acts on the entire face of piston valve 109 in chamber 116, the piston valve 109 will not be returned upwardly into seated relation on the annular rib 117 until the pressure in traction truck brake cylinder 2 has been reduced to a pressure below the certain uniform pressure required to unseat the piston valve from the rib seat 117. When the piston valve 109 is reseated on the rib seat 117 after sufficient reduction in the pressure in brake cylinder 2, the stem 128 again unseats the check valve 125 to hold open the communication between brake cylinder 2 and straight air pipe 5.

As the rate of retardation of the train of cars is momentarily decreased due to the reduction in the brake cylinder pressure, the spring 73 of the retardation controller device 8 returns the cylindrical slide valve 67 in the left-hand direction against the force exerted by the inertia body 83 so that the connection between the passage 72 and the atmospheric exhaust passage 68 by way of the fluted portion 69 of slide valve 67 is cut off.

The pneumatic switch device 6 then functions, as before described, to regulate the brake cylinder pressure to a degree corresponding to the pressure of the fluid in the chamber 43 in the pneumatic switch device 6 whenever and as often as the pressure in the chamber 43 is reduced by operation of the retardation controller device 8, so that a substantially constant rate of retardation is produced. It will be understood that when the train is ultimately brought to a stop, the spring 73 shifts the cylindrical slide valve 67 of the retardation controller 8 to the position shown to connect passages 71 and 72 and thus again restore full control pipe pressure in chamber 43 of the pneumatic switch device 6, so that adequate brake cylinder pressure is maintained to hold the train against movement.

Release of the brakes

The brakes may be released at any time by operation of the operating handle 63 of the brake controlling valve device 7 to release position, so that the pressure in the chamber 43 of the pneumatic switch device 6 is immediately reduced by flow of the fluid under pressure through the control pipe 61, control reservoir 9, port 105, past the check valve 102, chamber 103, port 104, passage 71 and the portion of the control pipe 61 leading to the brake controlling valve device 7, and thence to atmosphere from the control pipe 61 in the usual manner through the valve device 7. It will be observed that the purpose of the ball check valve 102 is to permit the release of fluid under pressure from the chamber 43 of the pneumatic switch device 6, notwithstanding the fact that the cylindrical slide valve 67 is in a position to cut off communication between the passage 72 and the passage 71, so that the release of the brakes may be effected at any time.

Upon the reduction in the pressure of the fluid in the chamber 43 of the pneumatic switch device 6 the diaphragm 42 returns upwardly to cause engagement of contact member 46 with the contact member 47 and thereby effects energization of the release magnet valve device 15 of the valve mechanisms 4 and the consequent unseating of the release valve 28. Fluid under pressure is accordingly released from the brake cylinders 2 and 3, and from the straight air pipe 5, to the atmosphere past the unseated release valve 28 and through exhaust port 36 of the valve mechanisms 4.

A graduated release of the brakes may be effected by returning the operating handle 63 toward the release position in steps, thereby permitting the pneumatic switch device 6 to reduce the brake cylinder pressure according to the reduction in pressure of the fluid existing in the chamber 43 of the pneumatic switch device 6 for each position of the operating handle 63.

In the same manner as described in connection with the operation of the retardation controller device 8, it will be observed that reduction of the pressure of the fluid in the traction truck brake cylinder 2 is not effected until the pressure of the fluid in the chamber 44 of the pneumatic switch device 6 and in the straight air pipe 5 reduces below the pressure of the fluid established in the traction truck brake cylinder 2, the ball check valve 125 being maintained seated on its associated valve seat to prevent reduction in the pressure of the fluid of the traction truck brake cylinder 2 by the higher pressure present in the chamber 126 of the pressure-limiting device 11. Thereafter, the pressure of the fluid in the traction truck brake cylinder 2 and the trailer truck brake cylinders 3 is reduced in unison. When the pressure of the fluid in the traction truck brake cylinder 2 is reduced sufficiently, the piston valve 109 is returned upwardly into seated engagement with the rib seat 117 and the ball check valve 125 is unseated from its associated valve seat by the stem 128. When the piston valve 109 is seated on the rib seat 117, the outer seated area surrounding the rib seat 117, that is the chamber 116, is connected to atmosphere by way of the passage 121, chamber 122 and vent port 113 in the screw plug 112 so that the spring 114 holds the piston valve 109 positively seated on the rib seat against the pressure of the fluid in the brake cylinder 2 and acting on the inner seated area of the piston valve 109 within the chamber 118.

Emergency features

For the sake of simplicity, the specific equipment whereby automatic service and automatic emergency applications of the brakes may be effected has been omitted from the drawing. It should be understood, however, that I contemplate and intend that such equipment, clearly shown in my above mentioned pending application Serial No. 741,063, be used in conjunction with the equipment shown in the drawing of the present application and described herein.

As indicated in the drawing, the pressure of the fluid which is normally maintained in the pressure cylinder 78 may be released for emergency application of the brakes, to increase the tension of the spring 73 of the retardation controller device 8 so that a higher rate of retardation may be obtained for emergency applications of the brakes as compared to that effected by the retardation controller for straight air applications, in the manner described, or for automatic service applications of the brake, in the manner shown and described in my pending application.

Summary

It will be seen, therefore, that my present invention is an improvement over that shown, described and claimed in my pending application Serial No. 741,063, and comprises a brake equipment including a valve device for limiting the ultimate pressure attainable in the traction truck brake cylinder of Diesel engine driven cars or trains while permitting the build-up of pressure of trailer truck brake cylinders to a degree in excess of that of the maximum attainable in the traction truck brake cylinder or cylinders. The pressure-limiting valve device is adapted to prevent reduction in the pressure of fluid in the traction truck brake cylinder until the pressure of the fluid in the trailer truck brake cylinders has been reduced to substantially the maximum pressure attained in the traction truck brake cylinder or cylinders, the pressure limiting valve device functioning thereafter to permit reduction in the traction truck brake cylinder pressure in unison with the reduction in the pressure of the trailer truck brake cylinder pressure.

The advantage of my invention is that it enables the application of the brakes for both the traction truck and trailer trucks of high speed trains at substantially the same braking ratio until the braking force with which the application of the brake shoes associated with the wheels on the traction truck approaches a force which might result in welding of parts of the brake shoes to the rim of the car wheel due to the excessive heat generated in the brake shoes, whereupon further increase in the braking force for the traction truck brakes is prevented.

While I have shown and described but one embodiment of my invention, it will be understood that various omissions, additions or modifications may be made therein without departing from the spirit of my invention. It is not my intention therefore to limit the scope of my invention except as necessitated by the scope of the prior art.

Having now described my invention, what I claim as new and desire to secure by Letters Patent, is:

1. In a fluid pressure brake system, the combination of a traction truck brake cylinder, a trailer truck brake cylinder, means for causing fluid under pressure to be supplied simultaneously to both cylinders to establish synchronously therein the same pressure for effecting application of the brakes in unison, means operative to cut off the further supply of fluid under pressure to the traction truck brake cylinder, regardless of the further supply of fluid under pressure to the trailer truck brake cylinder, when the pressure of the fluid in the traction truck brake cylinder attains a certain uniform pressure, and a safety valve for limiting the pressure in the traction truck brake cylinder to a different uniform pressure which is higher than the said certain uniform pressure.

2. In a fluid pressure brake system, the combination of a traction truck brake cylinder, a trailer truck brake cylinder, means for causing fluid under pressure to be supplied simultaneously to both cylinders to effect application of the brakes in unison, means operative to cut off the further supply of fluid under pressure to the traction truck brake cylinder, regardless of the further supply of fluid under pressure to the trailer truck brake cylinder, when the pressure of the fluid in the traction truck brake cylinder attains a certain uniform pressure, and a safety valve normally not in communication with the traction truck brake cylinder and adapted to be placed in communication therewith, upon operation of said last means, for limiting the traction truck brake cylinder pressure to a different uniform pressure which is higher than said certain uniform pressure.

3. In a fluid pressure brake system, a straight air pipe, a trailer truck brake cylinder in constant communication with the straight air pipe, a traction truck brake cylinder, a valve device normally establishing communication between the traction truck brake cylinder and the straight air pipe, and means for supplying fluid under pressure into said straight air pipe to build up pressure in the brake cylinders simultaneously, said valve device being operative in response to a certain uniform pressure in the traction truck brake cylinder to close communication between said traction truck brake cylinder and the straight air pipe and thereby cut off the further increase in pressure in the traction truck brake cylinder notwithstanding an increase in the pressure in the straight air pipe and in the trailer truck brake cylinder above the said certain uniform pressure.

4. In a fluid pressure brake system, a straight air pipe, a trailer truck brake cylinder in constant communication with the straight air pipe, a traction truck brake cylinder, a valve device normally establishing communication between the traction truck brake cylinder and the straight air pipe, means for supplying fluid under pressure into said straight air pipe to build up pressure in the brake cylinders simultaneously, said valve device being operative in response to a certain uniform pressure in the traction truck brake cylinder to close communication between said traction truck brake cylinder and the straight air pipe and thereby cut off the further increase in pressure in the traction truck brake cylinder notwithstanding an increase in the pressure in the straight air pipe and in the trailer truck brake cylinder above the said certain uniform pressure, and means subject to the opposing pressures in the straight air pipe and in the traction truck brake cylinder for preventing release of fluid under pressure from the traction truck brake cylinder as long as the pressure in the straight air pipe exceeds that in the traction truck brake cylinder.

5. In a fluid pressure brake system, in combination, a traction truck brake cylinder, a trailer truck brake cylinder, a straight-air pipe, means for controlling the pressure of fluid in said pipe, means connecting the trailer truck brake cylinder to said pipe to cause the pressure in the trailer truck brake cylinder to always be the same as the pressure in said pipe, a one-way valve controlling communication through which fluid under pressure is supplied from the said pipe to the traction truck brake cylinder and released from the traction truck brake cylinder to the said pipe, fluid pressure responsive means subject to the pressure in the traction truck brake cylinder and effective to unseat said one-way valve to permit fluid under pressure to be supplied from said pipe to the said traction truck brake cylinder as long as the pressure in the traction truck brake cylinder does not exceed a certain uniform pressure and effective to cause the said one-way valve to seat, when the pressure in the traction truck brake cylinder exceeds said certain uniform pressure, to prevent the further supply of fluid under pressure from the said pipe to the traction truck brake cylinder, said one-way valve, when seated, being subject to the opposing pressures in the said pipe and in the traction truck brake cylinder for preventing the release of fluid under pressure from the traction truck brake cylinder as long as the pressure in the said pipe exceeds that in the traction truck brake cylinder.

ELLIS E. HEWITT.